May 11, 1937.　　　S. D. BUTTERWORTH　　　2,079,929
CAR LOADING DEVICE
Filed Sept. 25, 1931　　　2 Sheets-Sheet 1

INVENTOR
Samuel D. Butterworth
BY
ATTORNEYS

May 11, 1937. S. D. BUTTERWORTH 2,079,929
CAR LOADING DEVICE
Filed Sept. 25, 1931 2 Sheets-Sheet 2

INVENTOR
Samuel D. Butterworth
BY
ATTORNEYS

Patented May 11, 1937

2,079,929

UNITED STATES PATENT OFFICE 2,079,929

CAR LOADING DEVICE

Samuel D. Butterworth, Detroit, Mich., assignor, by mesne assignments, of ninety-nine per cent to The Worth Company, a corporation of Michigan Application September 25, 1931, Serial No. 565,004

31 Claims. (Cl. 105—368)

The invention relates to car loading devices and it has particular relation to devices for mounting and suspending vehicles in freight cars or the like for transportation purposes.

The principal objects of the invention are to provide means for mounting and suspending vehicles in freight cars or the like which facilitates manual manipulation and placement of the vehicle properly and secures the latter against undesirable movement during transportation thereof; to provide means for mounting and suspending vehicles in freight cars or the like by means of which a vehicle can be elevated and inclined in a predetermined manner by a single manual manipulation; to provide novel means for elevating and inclining a vehicle in a freight car or the like which facilitates placing the vehicle in the car and reduces the amount of manual labor ordinarily required; and to provide novel means for maintaining a vehicle in such elevated and inclined position and preventing undesirable movement thereof during transportation.

For a better understanding of the invention reference may be had to the accompanying drawings forming a part of the specification, wherein.

Figure 2:
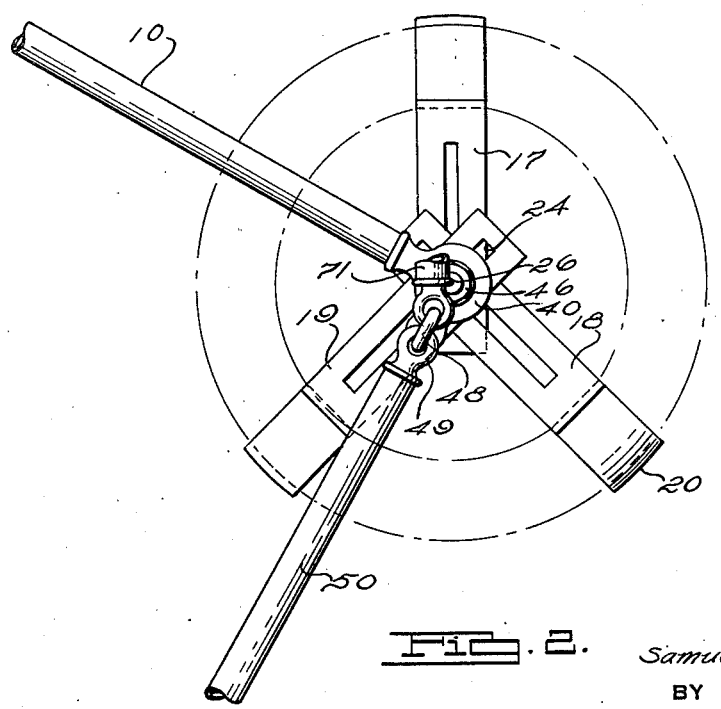
Fig. 2 is a detail view illustrating elements adapted to engage a tire on the vehicle for suspending the latter in the freight car.
Figure 3:
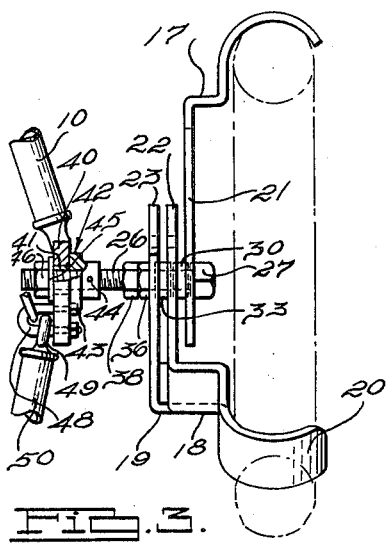
Fig. 3 is a side view of the construction shown by Fig. 2 illustrating certain parts in cross section for the purpose of clarity.
Figure 7:
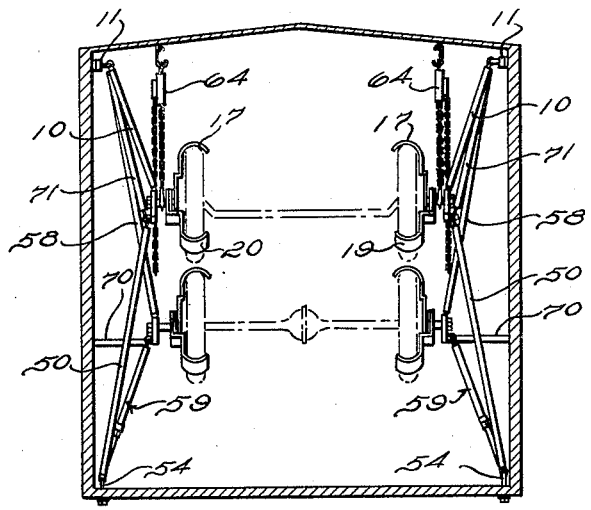
Fig. 7 is a cross sectional view taken substantially along line 7—7 of Fig. 1.
Figure 5:
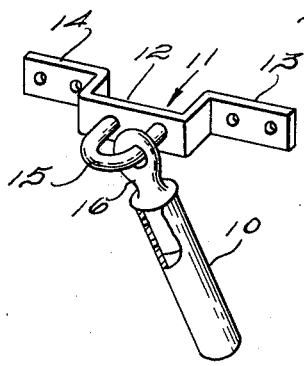
Fig. 5 is a detail view illustrating the manner in which the upper supporting rods associated with the vehicle engaging devices, are connected to an upper part of the freight car.

According to one form of the invention as illustrated by the drawings, a motor vehicle in the freight car is elevated into an inclined position with respect to the floor of the car and maintained in such position by means including rods 10 pivotally connected to an upper part of the car such as the upper part of the side walls, and one of such rods extends to each of the front wheels. In pivotally connecting the upper end of each of the rods 10, a bracket 11 shown by Fig. 5 is provided which includes a central U shaped portion 12 and flanged portions 13 and 14 at the sides thereof which are connected by bolts to the side wall of the car. The U shaped portion 12 is provided with a U bolt 15 which engages an eye 16 secured to the upper end of the rod. For connecting the lower end of each rod to one of the front wheels of the vehicle, tire embracing arms 17, 18 and 19 are provided as shown by Figs. 2 and 3, and each of these arms is provided at its outer end with an arcuate projection 20 adapted to embrace a part of the tire. The arms are so arranged that the arcuate projections 20 will be spaced circumferentially of the tire, and preferably the lower arms 18 and 19 will be at right angles to each other while the upper arm extends vertically.

Figure 4:
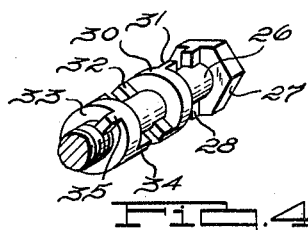
Fig. 4 is a detail view in perspective, illustrating a bolt and associated parts utilized in the car engaging device shown by Figs. 2 and 3.

Centrally of the wheel, the arms are provided with radially directed portions 21, 22 and 23 respectively, which are so offset with respect to the wheel that such radial portions of the arms will be spaced when in their operative positions. As best shown by Fig. 2, each radial portion of the arms is provided with a longitudinally extending slot 24 and a bolt 26 extends through all of the slots. This bolt, as shown by Fig. 4, has a head 27 on that end adjacent the wheel, and diametrically disposed radial projections 28 adjacent the head which fit in the slot 24 of the inner arm 17 for preventing turning of the latter on the bolt and for permitting radial movement of the arm. Between arms 17 and 18, a collar 30 is slidably mounted on a smooth portion of the bolt, and this collar at opposite sides has radial projections 31 and 32 located in circumferentially displaced relation, which are adapted to cooperate with the slots in these arms. Similarly, a collar 33 is disposed between arms 18 and 19 on the smooth portion of the bolt and has radial projections 34 and 35 cooperating with the slots in these arms. A nut 36 on a threaded portion of the bolt at the outer side of arm 19 is utilized for locking the arms and collars on the bolt between the nut and the head 27. It is to be understood that the radial projections on the collars and at the inner side of head 27, while projecting into the slots, do not engage each other but, to the contrary, that they are spaced in order to enable the bodies of the collars and the nut 27 to directly engage the arms and clamp them together. When the nut 36 is loosened, it is apparent that the arms can be moved outwardly and radially of the bolt and hence the arcuate projections 26 moved over the tire and then the arms moved inwardly toward the bolt and then clamped on the latter for engaging the tire in a positive manner. A lock nut 38 on the bolt at the outer side of nut 36 is used for preventing accidental loosening of the latter.

The lower end of each of the rods 10, is secured to a plate 40 having a central opening which rotatably fits on a sleeve portion 41 of a collar 42. This collar has a flange portion 43 for preventing movement of the plate along the sleeve portion 41 in one direction, and is secured to the bolt by means of a pin 44. At the outer side of the sleeve portion 41, a washer 45 is mounted on the bolt and outwardly of the washer a nut 46 is utilized for preventing movement of the plate 40 in the other direction and for maintaining it on the sleeve portion.

Figure 6:
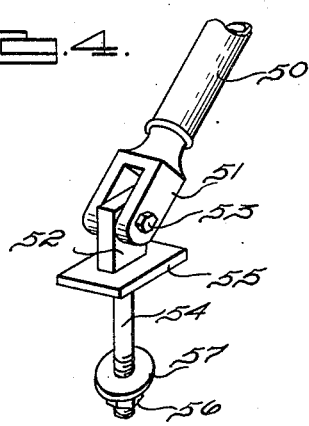
Fig. 6 is a detail view illustrating the manner in which the lower rods associated with the vehicle engaging devices, are connected to the floor of the freight car.

On the lower part and eccentrically of plate 40, a U bolt 48 is secured, and the latter in turn is pivotally connected to an eye 49 on the upper end of a lower rod 50. The latter at its lower end, as shown by Fig. 6, has a bifurcated portion 51 pivotally connected to a block 52 projecting between the legs of the bifurcated portion, by means of a bolt 53. The block 52 constitutes the head of a bolt 54 extending through a plate 55 and the floor of the car, which has a nut 56 and washer 57 on its lower end clamping the plate against the floor.

Each of the front wheels is associated with apparatus such as that described, including an upper rod 10 and a lower rod 50. Similarly, each of the rear wheels is associated with a similar apparatus including upper rods 58 and lower rods 59. However, each rod 59 comprises two parts, a part 60 telescoping into a part 61 and having threaded engagement therewith for the purpose of adjusting the length of the rod. A nut 62 threaded on the part 61 serves to lock the parts 60 and 61 together when the length of the rod is adjusted.

The rods 10 for the front wheels are slightly longer than the rods 58 for the rear wheels, but all of the rods are connected pivotally at their upper ends to fixed points at opposite sides of the car and such points are preferably of equal height with respect to the floor of the car. When a motor vehicle is to be mounted in the freight car it is rolled thereinto until it assumes the position shown at 63 in Fig. 1 in broken lines. Then the tire engaging devices and the rods 10 and 58 are swung downwardly from positions adjacent the upper edges of the side walls where they normally will be retained in out-of-the-way positions, until such tire engaging devices are adjacent the respective tires they are adapted to co-operate with. When the car is properly positioned on the floor, the rods 10 are inclined as shown in broken lines in Fig. 1, upwardly and slightly forwardly of the front wheels of the vehicle, while the rods 58 for the rear wheels assume vertical positions, as indicated in broken lines. It will be understood that the lower sets of rods 50 and 59 associated with the front and rear wheels respectively, are not at first connected to the floor and hence permit free swinging movement of the rods 10 and 58. Then the tire engaging devices on the latter rods are associated with the front and rear tires in the manner previously described. Chain falls indicated at 64 and associated with the tire engaging devices on the front wheels or with opposite ends of the front axle are then utilized for elevating the vehicle.

Figure 1:
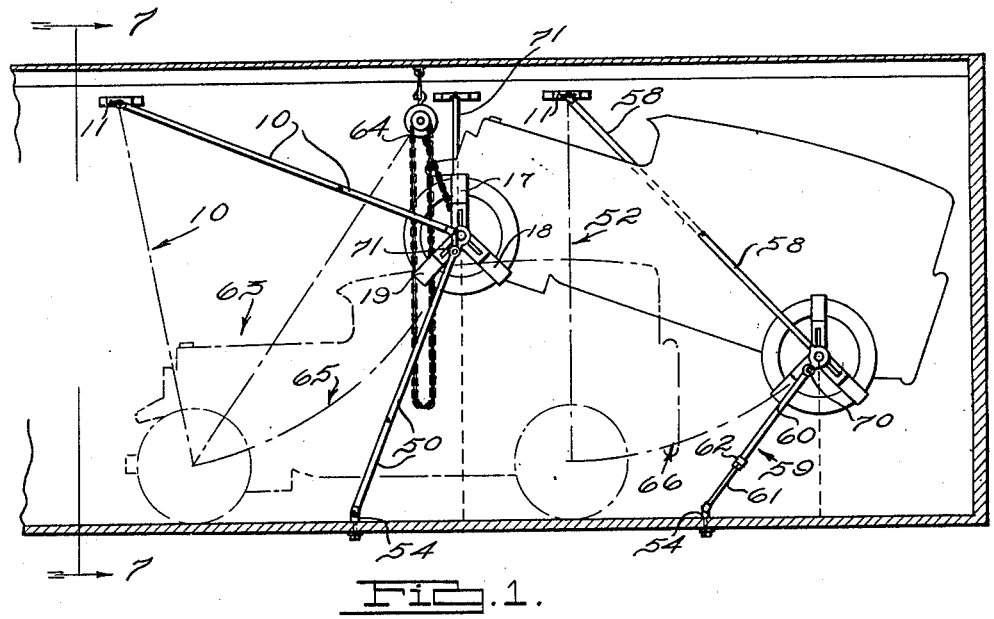
Fig. 1 is a fragmentary, longitudinal cross sectional view of a freight car illustrating the manner of mounting and suspending a vehicle in the car, according to one form of the invention.

When these chain falls are operated, it is apparent that the front axle of the vehicle will swing through an arc indicated at 65 in Fig. 1 in broken lines, the radius of curvature of which is equal to the length of rods 10. When this operation begins to occur, the body of the vehicle acting as a link, will cause the rear axle to swing through an arc indicated at 66 in broken lines, the radius of curvature of which is equal to the length of rods 58. Upward movement of the front wheels will occur as long as the chain falls are operated but the distance the front end of the vehicle is elevated is predetermined and governed by the dimensions of the car so that maximum space will be provided beneath the vehicle for loading another vehicle beneath it. When the front axle has been so elevated, the rods 50 are secured to the blocks 52 on the floor of the freight car and then the chain falls may be released. While the chain falls preferably are to be used only for elevating or lowering the vehicle, it is quite apparent that they hold the vehicle in position prior to placing the rods 50 and 59, and that under certain circumstances, it may be desirable to use the chain falls for holding the vehicle elevated without using rods 50 and 59. The rear axle will continue to move through the arc 66 until the front and rear axles are aligned approximately with the pivotal connections between the upper ends of rods 10 and the side walls of the car. If the front were elevated until it passed a line joining the pivotal connection between the upper end of rod 10 and the car, and the rear axle, slight downward movement of the rear axle might occur but preferably the front axle is so moved that this slight downward movement of the rear axle does not occur or, in other words, the front axle assumes a position substantially in alignment with the rear axle and the pivotal connections between rods 10 and the wall of the freight car. The lower rods 59 for the rear axle then are secured to the floor of the freight car in the same manner as rods 50 are secured thereto. The adjustability of rods 59 permits the accommodation of vehicles having different lengths or wheel bases without altering the position of the connections between rods 59 and the floor.

In elevating the vehicle, it is apparent that the chain falls in conjunction with rods 10 will prevent the front axle from falling, while the rear axle can not fall for the reason that it would in falling, have to move about two centers, namely the front axle and the pivotal connections between rods 58 and the walls of the car. Since the rear axle could not swing about both centers at the same time, with both centers fixed, it is prevented from falling.

The rods 50 and 59 of course add to the stability of the mounting and after the chain falls are removed, maintain the rear and front axles in fixed positions. For preventing sideswaying of the vehicle, side thrust rods 70 are pivotally connected to the rear tire embracing devices and extend to the side walls of the car where they removably fit into recesses. Similarly, thrust and tension rods 71 are employed in conjunction with the front tire embracing devices, and extend to and are pivotally connected to the eaves of the car, preferably because of the location of door openings in the side walls of the car adjacent the front axle.

When a vehicle is mounted in a freight car in this manner it is apparent that if the car in moving forwardly should stop abruptly, force tending to move the vehicle would act forwardly and largely along the rods 10 and 58. Hence, these rods would serve as thrust elements and efficiently prevent any such forward movement of the vehicle in the car. If the freight car were moving rearwardly and should suddenly stop, the rods 10 and 58 would act as tension elements and prevent rearward movement of the vehicle in the car. It is decidedly advantageous that the rods 10 and 58 act as thrust and tension elements in this manner because the vehicle is more positively prevented from moving if the forces tending to move the vehicle act along elements adapted to take tension or compression.

When the vehicle is to be removed, the rods 50 and 59 are disconnected from the floor of the car, then the chain falls are operated to lower the vehicle until it rests on the floor in its original position, then the tire engaging devices are removed from the wheels, and then the entire apparatus may be swung up against the side walls of the car into upper and out-of-the-way positions.

It will be understood that when the arms 17, 18 and 19 are released by releasing the nuts 36 and 38 on bolt 26, the arms can be turned on the bolt and more or less aligned with the upper rod associated with it. When so arranged, the arms require less space and the rods and tire embracing devices can be more efficiently mounted in upper and out of the way positions.

An apparatus of this character is particularly useful because it permits the positioning of vehicles properly in a most efficient manner and hence enables storing of the largest number of vehicles possible in a given size of freight car. If the wheel base of the vehicle is larger, the length of rods 59 can be changed accordingly and, in any event, the apparatus is so arranged and so operates that the rear of the vehicle would not engage the rear wall or roof of the freight car regardless of the fixed position of the front axle. The fact that the rods 58 are initially in vertical positions and hence their lower arcuate movement substantially parallel to the floor of the freight car, readily permits the accommodation of vehicles having different wheel bases without altering the apparatus. If the wheel base is longer, the rear axle will be moved upwardly a greater distance but the arrangement is such that the rear of the vehicle will not engage the roof or rear wall of the car. In any event, the rear axle will always be positioned along the arc 66 and the front axle will be located at a fixed point determined by the rods 50 and 10.

Moreover, the rear axle will automatically be positioned, such position depending only on the wheel base length of the vehicle.

While the invention is described above in connection with freight cars and is particularly adapted for such use, it is apparent that the means for elevating and supporting the automobile is also adapted for use in any other type of storage compartment whether stationary or in a freight conveyance. For example, this invention may be used in motor trucks, ships, garages, or any other place where it is necessary to conserve floor space. Accordingly, it will be understood that in the following claims, the expressions "freight car", "car", etc. may be construed to cover any storage compartment. It is apparent, further, that other changes may be made in the specific embodiment disclosed without departing from the spirit of the invention as claimed herein.

I claim:

1. A device for loading vehicles in freight cars comprising members pivotally connected to an upper part of the car for supporting a vehicle by suspension, said members being movable in substantially vertical planes and means for moving said members about their pivots and elevating the vehicle.

2. A device for loading a vehicle in freight cars, comprising spaced members pivotally connected to the car for movement in substantially vertical planes, and being pivotally connected to spaced parts of the vehicle, said members having different lengths, and means for moving the members about their pivotal connections with the car, for moving the vehicle into a vertically inclined position.

3. In a vehicle loading device for freight cars, means for guiding one part of the vehicle in an arcuate path, means for guiding another part of the vehicle on an arcuate path having an axis of curvature spaced from the axis of curvature of the first arcuate path, and means cooperating with the guiding means for elevating the vehicle.

4. A vehicle loading device for freight cars, comprising members pivotally connected to the car and having their pivotal axes spaced from each other, said members being pivotal in substantially vertical planes, means on said members for respectively supporting different parts of the vehicle, and means connected to the car for swinging said member about their pivots and elevating a part of the vehicle.

5. In combination with a freight car, a device for mounting and supporting a vehicle therein, comprising means pivotally connected to the car at one side of one vehicle axle, means pivotally connected to the car for supporting the other axle of the vehicle, means for operatively connecting said members to the axles, and means for moving said members about their pivotal connections with the car and elevating a part of the vehicle relative to another part.

6. In combination with a freight car, a device for loading a vehicle therein, comprising members pivotally connected to the car for movement in substantially vertical planes, means pivotally connected to said members for engaging the tires on the vehicle wheels, and means connected to the car for raising a part of the vehicle and moving said members about their pivotal connections with the car for elevating the wheels and vehicle.

7. In combination with a freight car, a device for loading a vehicle therein, comprising vehicle suspension means connected to an upper part of the car for movement in substantially a vertical plane, means for connecting said means to the vehicle, and means for raising a part of the vehicle and moving said first means about its pivotal connection with the car.

8. In combination with a freight car, of a device for loading a vehicle therein, comprising mechanism connected to an upper part of the car and operable for guiding the vehicle automatically into an inclined plane with the vehicle entirely above the floor of the car, and means operating in conjunction with such mechanism for moving the vehicle from a position on the floor automatically into such inclined position.

9. The method of loading an automobile in a freight car which comprises moving the automobile into the car into a position longitudinally thereof and with the rear end of the automobile next to an end wall of the car and the front end of the automobile next to the center of the car, and then simultaneously moving the automobile rearwardly and toward such end wall of the car, and tilting the same to elevate the front end of the automobile with respect to the rear end thereof by a combined rectilinear and rotary movement, and securing the automobile in its tilted position.

10. The method of loading an automobile in a freight car which comprises moving the automobile into the car into a position longitudinally thereof and with the rear end of the automobile next to an end wall of the car and the front end of the automobile next to the center of the car, and then simultaneously moving the automobile rearwardly and toward such end wall of the car and elevating the entire automobile with respect to the floor of the car by a combined rectilinear and rotary movement, and into a tilted position with the front end elevated more than the rear end, and then securing the automobile in its tilted position.

11. The method of loading a vehicle in a freight car which comprises moving the vehicle into the car and into a position longitudinally thereof, and then swinging the vehicle longitudinally of the car and into an elevated position by a combined rectilinear and rotary movement with the vehicle entirely spaced from the floor.

12. The combination with a freight car or the like, of means pivotally connected to upper parts of the car and adapted to support a vehicle, means for swinging the members and elevating a part of the vehicle, and thrust taking means connected to the first mentioned means and adapted to be connected to a lower part of the car for supporting the elevated part of the vehicle after it is so elevated.

13. The combination with a freight car or the like, of means pivotally connected to upper parts of the car and adapted to support a vehicle, means for swinging the members and elevating a part of the vehicle, and thrust taking means connected to the first mentioned means and adapted to be connected to a lower part of the car for supporting the elevated part of the vehicle after it is so elevated, said thrust taking means being pivotally connected to the first means so that they may be pivotally moved to their points of engagement with the lower part of the car.

14. In combination, a freight car, means connected to the car for supporting a vehicle and guiding it automatically by a combined rectilinear and rotary movement from a position adjacent the floor of the freight car to an inclined position wherein the vehicle is in an inclined plane passing downwardly above the end of the floor, and means cooperating with the first means for elevating the vehicle and guiding it into such position.

15. In combination, a freight car, means for engaging and supporting a vehicle, rods connected to said means pivotally connected to the car at longitudinally spaced points in the latter and adapted to swing a vehicle engaged by said means from a position adjacent the floor of the car, into an inclined position, and means cooperating with the rods for elevating the vehicle and moving it into such inclined position.

16. In combination, a freight car, a vehicle in the car, a pair of arms pivotally connected to the car for swinging movement in substantially vertical planes and adapted to raise one end of the vehicle, another pair of arms pivoted to the car and adapted to raise the other end of the vehicle, means for supporting the ends of the vehicle on such pairs of arms and thereby joining all of the arms for simultaneous movement, and means for swinging the arms and elevating the vehicle.

17. In combination, a freight car, a vehicle in the car, a pair of arms pivotally connected to the car for swinging movement in substantially vertical planes and adapted to raise one end of the vehicle, another pair of arms pivoted to the car and adapted to raise the other end of the vehicle, means for supporting the ends of the vehicle on such pairs of arms and thereby joining all of the arms for simultaneous movement, and means for swinging the arms and elevating the vehicle, one pair of such pairs of arms being longer than the other pair so as to move the vehicle into an inclined position.

18. In combination, a freight car, a vehicle in the car, a pair of arms pivotally connected to the car for swinging movement in substantially vertical planes and adapted to raise one end of the vehicle, another pair of arms pivoted to the car and adapted to raise the other end of the vehicle, means for supporting the ends of the vehicle on such pairs of arms and thereby joining all of the arms for simultaneous movement, and means for swinging the arms and elevating the vehicle, the distance longitudinally of the car between the ends of the pairs of arms pivoted to the car being greater than the longitudinal distance between the ends supporting the vehicle, so that upon moving the arms, the vehicle is moved into an inclined position.

19. In combination, a support, means pivoted to the support and adapted to swing one end of a vehicle or the like in a substantially vertical plane, means pivoted to the support and adapted to swing the other end of the vehicle in a substantially vertical plane, a vehicle supported by said pair of means, and means for swinging both means to elevate the vehicle.

20. In combination, a support, means pivoted to the support and adapted to swing one end of a vehicle or the like in a substantially vertical plane, means pivoted to the support and adapted to swing the other end of the vehicle in a substantially vertical plane, a vehicle supported by said pair of means, and means for swinging both means to elevate the vehicle, the pivotal axes of said means being so spaced with respect to the vehicle that the vehicle is automatically shifted into an inclined position.

21. In a railway house car having an automobile for shipment therein, means for maintaining an end of said automobile in elevated position comprising a bar, a member carried by said bar adapted to receive a portion of the periphery of a wheel provided at said end of the automobile and a bracket secured to said car and suspending said bar for substantially longitudinal swinging movement, a second bar, a member carried by said second bar adapted to receive a portion of the periphery of the other wheel provided at said end of the automobile, and a bracket for suspending said second bar for substantially longitudinal swinging movement.

22. In a railway house car having an automobile for shipment therein, independent means each engaging a portion of the periphery of a wheel provided at one end of said automobile for suspending said end, each of said means comprising a bar, a wheel receiving member carried by said bar adjacent one end thereof, the opposite end of said bar being suspended from a side of said car, whereby said bar is capable of substantially longitudinal swinging movement.

23. In a carrier vehicle, means for suspending an end of an automobile comprising a bracket secured to the side of said vehicle, a bar pivoted to said bracket for longitudinal swinging movement in the carrier vehicle, and a member adapted to receive a portion of the periphery of a wheel at said end of said automobile carried by said bar.

24. In a railway house car provided with a side wall, means for suspending an end of an automobile comprising a bracket secured to said side wall, a bar pivoted to said bracket for longitudinal swinging movement in the carrier vehicle and a member adapted to receive a portion of the periphery of a wheel at said end of said automobile adjustably secured to said bar.

25. In a railway house car provided with a side wall, means for suspending an end of an automobile comprising a bracket secured to said side wall, a transversely extending pin carried by said bracket, a tubular member having one end provided with an eye through which said pin is adapted to extend, and a member secured adjacent the other end of said tubular member adapted to receive a portion of the periphery of a wheel at said end of said automobile.

26. In combination, a railway box car, means for engaging and supporting an automobile, means pivotally connecting said supporting means to an upper part of the car for a combined upward and longitudinal movement with an automobile supported thereby, and means for elevating and moving said supporting means longitudinally under the influence of said connecting means.

27. In combination, a freight car, supporting means having portions engaging opposite ends of an automobile and supporting the automobile thereby, means pivotally connecting said supporting means to an upper part of the freight car for movement from a position in proximity to the floor of said car upward and longitudinally, and means for moving said vehicle in the path defined by said connecting means and supporting means.

28. In combination, a freight car, means for engaging and supporting an automobile, means connecting said automobile engaging and supporting means to the freight car for movement of the entire automobile supported thereby from a position adjacent the floor to an elevated semi-decking position by a combined rotary and rectilinear movement, and means for effecting such movement of the supporting means and automobile automatically.

29. In combination, a freight car, rods pivotally connected to the car on spaced transversely extending axes, and means carried by said rods for engaging and supporting both ends of an automobile, said rods being adapted to swing about their axes from a position wherein an automobile adjacent the floor may be engaged by said supporting means to a position wherein the supporting means and the entire automobile engaged thereby are elevated above the floor.

30. In combination, a freight conveyance having a floor, supporting means adapted to engage opposite ends of an automobile and support the automobile thereby, means connecting said support means to the freight car for movement upward and longitudinally therein comprising longitudinally spaced members pivoted to the freight conveyance and to the supporting means respectively on parallel transverse axes, said members being of unequal length whereby, on pivotal movement thereof with respect to the conveyance, the automobile engaged by the supporting means will be moved longitudinally and elevated from a position adjacent the floor to an inclined position entirely above the floor.

31. In combination, a freight conveyance having a floor, supporting means having portions engaging opposite ends of an automobile and supporting the automobile thereby, means connecting said supporting means to the freight car for movement from a position wherein an automobile engaged by said means is adjacent the floor upwardly and longitudinally of the conveyance into a position wherein the entire automobile is elevated above the floor comprising longitudinally spaced members pivoted to the freight conveyance and to the supporting means respectively on parallel transverse axes.

SAMUEL D. BUTTERWORTH.